US006926426B2

(12) United States Patent
Currie et al.

(10) Patent No.: US 6,926,426 B2
(45) Date of Patent: Aug. 9, 2005

(54) CORDLESS LED LIGHT DRIVING WALL MODULE AND NIGHT LIGHT

(76) Inventors: Robert M. Currie, 325 Bavignon, Dollard-des-Ormeaux, Quebec (CA), H9B 1Y4; Jonas J. Robertson, 2521 Orbit Ct., Harvey, LA (US) 70058

( * ) Notice: Subject to any disclaimer, the term of this patent is extended or adjusted under 35 U.S.C. 154(b) by 104 days.

(21) Appl. No.: 10/680,244

(22) Filed: Oct. 8, 2003

(65) Prior Publication Data

US 2004/0160769 A1 Aug. 19, 2004

Related U.S. Application Data

(60) Provisional application No. 60/416,824, filed on Oct. 8, 2002, provisional application No. 60/418,264, filed on Oct. 15, 2002, and provisional application No. 60/418,567, filed on Oct. 16, 2002.

(51) Int. Cl.$^7$ ................................................. F21V 7/04
(52) U.S. Cl. ........................ 362/282; 362/310; 362/147
(58) Field of Search ............................... 362/147, 240, 362/241, 276, 277, 282, 301, 302, 310, 311, 351, 393, 437, 35

(56) References Cited

U.S. PATENT DOCUMENTS

| | | | | |
|---|---|---|---|---|
| 1,670,572 A | * | 5/1928 | Hotchkin ................... 362/282 |
| 3,266,014 A | * | 8/1966 | Leotta .................... 340/815.77 |
| 3,877,171 A | * | 4/1975 | Sloop et al. ................ 446/485 |
| 4,104,615 A | * | 8/1978 | Hunter ..................... 340/472 |
| 5,126,923 A | * | 6/1992 | Hall, II ..................... 362/35 |
| 5,506,761 A | * | 4/1996 | Strauss ..................... 362/267 |
| 5,523,929 A | * | 6/1996 | Ogihara .................... 362/183 |
| 6,276,813 B1 | * | 8/2001 | Victor ...................... 362/226 |
| 6,390,647 B1 | * | 5/2002 | Shaefer .................... 362/276 |
| 6,561,677 B1 | * | 5/2003 | Leen ....................... 362/276 |
| 6,612,720 B1 | * | 9/2003 | Beadle ..................... 362/287 |
| 6,857,765 B2 | * | 2/2005 | Kameda et al. .............. 362/355 |
| 2005/0018426 A1 | * | 1/2005 | Dickie ..................... 362/287 |

* cited by examiner

*Primary Examiner*—Sandra O'Shea
*Assistant Examiner*—Hargobind S. Sawhney
(74) *Attorney, Agent, or Firm*—Merek Blackman & Voorhees, LLC

(57) ABSTRACT

A novel lighting system utilizing low power consumption LEDs to provide safe, economical and decorative lighting. In a first embodiment, and acrylic candle body having a 45 degree reflector is mounted on top of a LED source to direct light along the body of the light and outwardly as directed by the reflector. The acrylic body can be rotated to point the reflected light in the desired direction. In a second embodiment, the acrylic candle and reflector are replaced by fiber optic ports and a light driver for connecting fiber optic strands that can be side lighting or end lighting to provide lighting at points distant from the light source. In a third embodiment, the fiber optic strand in run in parallel inside or outside a transparent liquid conduit such as a modified garden hose, a beverage dispenser, or a kitchen faucet to light the conduit and or the spray of the hose in a single or multiple colors.

8 Claims, 5 Drawing Sheets

CORDLESS LED LIGHT DRIVING WALL MODULE AND NIGHT LIGHT

CROSS REFERENCE TO RELATED APPLICATIONS

This application claims the benefit of U.S. Provisional Application 60/416,824, filed Oct. 8, 2002, entitled Cordless LED Light Driving Wall Module, which is hereby incorporated by reference. This application also claims the benefit of U.S. Provisional Application 60/418,567, filed Oct. 16, 2002, entitled Acrylic Night Light, which is hereby incorporated by reference and Provisional Application 60/418,264, filed Oct. 15, 2002, entitled Illuminated Fluid, which is also hereby incorporated by reference.

BACKGROUND OF THE INVENTION

1. Field of the Invention

The present invention relates to a fiber optic light driving module and a method of providing a decorative night lighting system.

2. Description of the Prior Art

Children's rooms, hallways and bathrooms have frequently been the location of night lights. The lighting is well known to many families with small children and others who get up during the night and want to be able to see well enough to traverse a hallway or locate a wall switch or bathroom sink. These lights have historically used a low wattage bulb capable of being plugged in and lit 24 hours per day seven days per week, with just enough illumination to allow others to navigate by but not enough to bright enough that users will need to turn the light off to go to sleep. The lights may have decorative figures or characters or art on an outer diffuser further diffusing the light.

The current light provides an attractive useful light for as a night light. In the preferred form, the light has a wall mounting base for plugging into an electrical wall outlet. Above the base, an acrylic tube is mounted having a LED mounted below or within the acrylic. Preferably an inner reflective coating or reflective stripes direct the light upwardly through the acrylic to an angled top. The inclined top of the light acts to direct a portion of the light outward to spotlight a desired area.

In a second embodiment, the base unit acts as a light driver for directing light outwardly from the housing through fiber optics or nylon rope covered fiber optics connected to the housing for directing the light to prespecified areas for use as a flashlight or spot light. The light may also be directed outwardly along the length of the fiber optic or covered fiber optic for use as edge lighting or other decorative purposes. The light may be controlled to provide color changes or strobing or other effects to enhance the decorative capability of the lighting.

In a third embodiment, the light driver directs light through fiber optics that are inserted within or parallel to water hoses or garden style hoses to either spot light the area being sprayed with water, or to illuminate the length of the tubing for decorative purposes. The light may also have a color driver for controlling the apparent color of the light. The color can be changed based on other selected criteria, for instance to show the status of a filter connected to the water hose or by providing different color lights along different hoses, for identifying the various hoses.

None of the above inventions and patents, taken either singly or in combination, is seen to describe the instant invention as claimed.

SUMMARY OF THE INVENTION

Accordingly, it is a principal object of the invention to provide a light driving wall module and night light for providing a decorative, low power consumption decorative lighting source.

It is another object of the invention to provide an acrylic crystal atop the light module for acting as a night light.

It is a further object of the invention to provide an acrylic night light having an angled top for directing light outwardly from the night light to a preselected area.

Still another object of the invention is to a light driver capable of connecting to fiber optic strands ("cables") for directing the light along a preselected path for edge lighting, spot lighting or other purposes.

It is yet another object of the invention to provide a light driver for directing lighting through liquid conduits for illuminating the length of the conduits or for providing a light source at the end of the tube.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
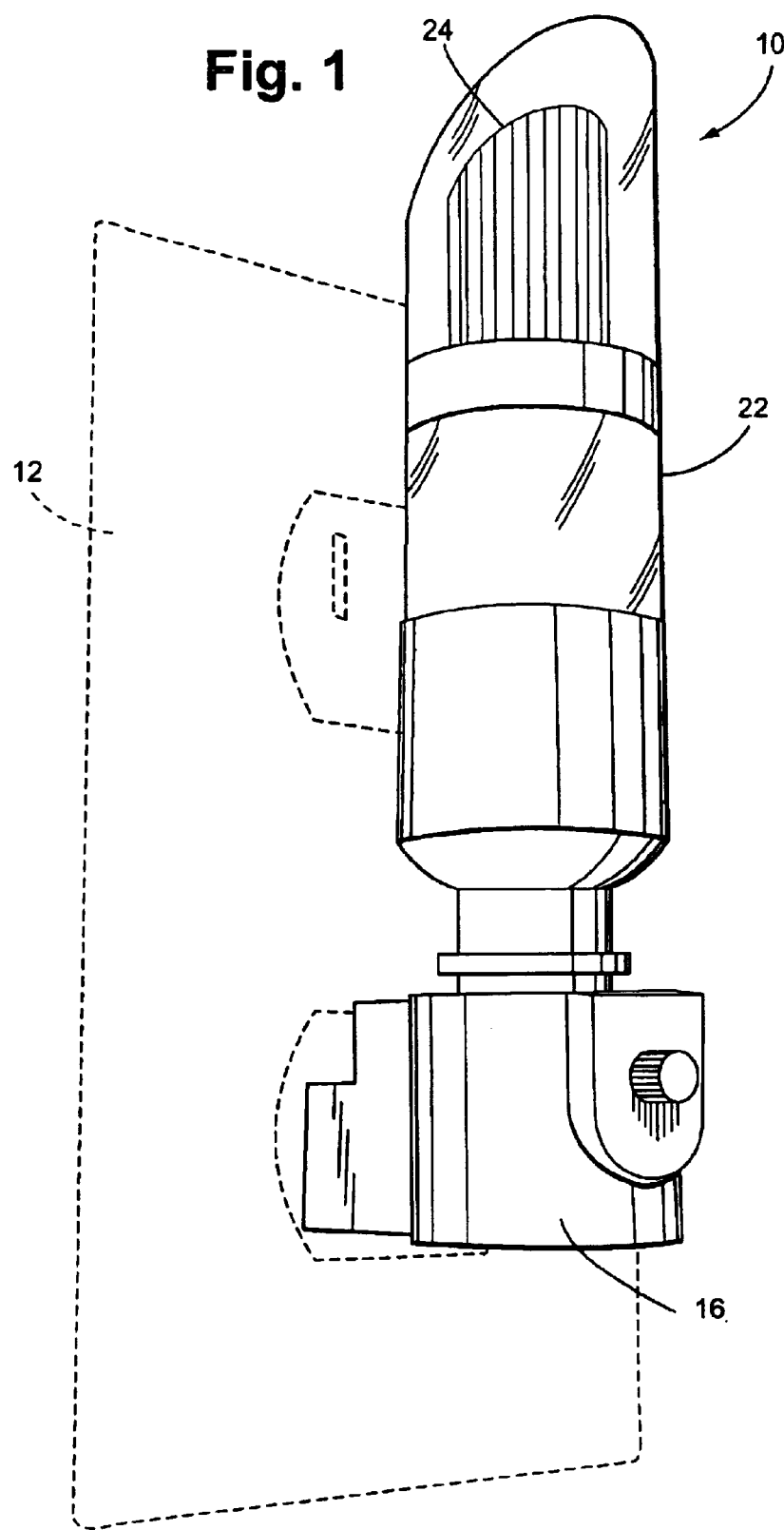
FIG. 1 is an environmental perspective of a nightlight according to the present invention.
Figure 2:
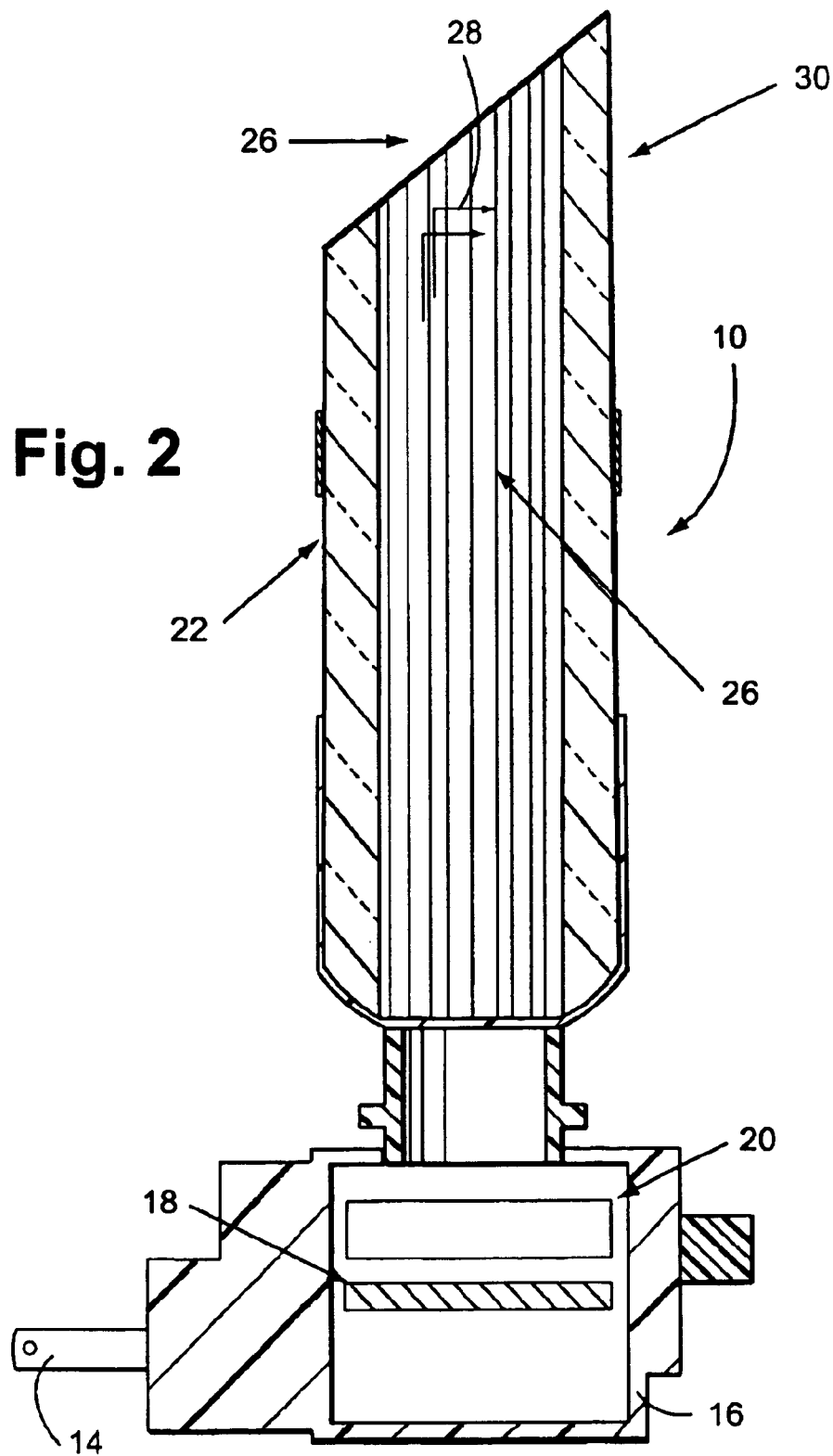
FIG. 2 is a cross-sectional side view of the nightlight of FIG. 1.

The present invention to methods of providing decorative and useful lighting which utilize low power consumption and safer LED lighting. The first embodiment shown in FIGS. 1 and 2 shows a nightlight 10. The nightlight is sized to plug into a standard electrical wall outlet 12 through the nightlight's plugs 14. As is known in the art, the nightlight is suspended from the electrical wall outlet by the prongs ("plugs") 14. The nightlight must be light enough and stand close enough to the wall to remain suspended from the outlet without falling out. The plugs 14 extend outwardly from a base 16 and are electrically connected to a step down circuit board 18. The step down transformer (not shown) steps the AC voltage down to a low AC voltage which is then rectified to a low DC voltage, preferably in the range of 2.0 to 4.0 volts suitable for driving L.E.D.'s.

The output of the step down circuit is connected to a super bright L.E.D. 20 such as a LUXEON L.E.D. or a clustered 5 mm LED ring may also be used as the light source. The lights may white or may be a single color ("colored LED") or changeable between several colors ("multi-color LED") to alter the character of the light for decorating or decorative effects.

The light from the LED source is directed upwardly from the non-translucent base to a clear or translucent/transparent acrylic body ("candle") 22. In the most preferred embodiment, the acrylic body is coextruded with a hollow interior 24 for transporting the light with minimal losses through the acrylic candle body. To this end inner reflective white stripes 26 are also preferably coextruded in the hollow interior 24. These stripes are white on the interior face to reflect a portion of the light upwardly along the elongated, vertical axis of the acrylic body. The outward face of the stripes can be colored white or another color to change the apparent color of the night light, especially during daylight hours when the night light is not lit, or ambient light far exceeds the output of the LEDs.

A portion of the light is allowed to escape between the stripes to provide ambient lighting of the acrylic body and to radiate outwardly therefrom. The amount of light allowed to travel outward from the body can be controlled by controlling the spacing between the stripes and by controlling the translucency/transparency of the acrylic body. The body can be formed with a cloudy or smoked ("frosted") appearance to diffuse the light through the body and to help direct the main portion of the light through the inner chamber. Preferably however, the acrylic is clear.

The acrylic body may alternatively have a solid center instead of a hollow area. The acrylic body may be one solid piece and having the stripes located within the acrylic body by pockets or extruding the acrylic body around the stripes to capture them within the acrylic body. Alternatively, the hollow interior 24 may be filled by a second acrylic body formed of the same composition as the outer acrylic body or by a different composition. The stripes would thus be trapped between the inner and outer acrylic body.

The top of the acrylic body is cut at an angle to the elongated axis of the acrylic body. Preferably the cut is approximately 45 degrees. Of course the cut could be at any angle, but is ideally within 30–60 degrees, and more preferably 45 degrees. The top of the acrylic body can be covered by a reflector 26 to reflect (at 28) the light perpendicular to the axis of the body and outwardly away from the night light forming a low power, low intensity ("soft") spot light. By rotating or swiveling the acrylic body 22, the direction of the light can be changed to point to a desired location or rotated towards the wall to minimize the amount of light directed outward from the light.

The acrylic body 22 of the night light 10 can be made as a single unit as shown in FIG. 1 or as two separate pieces as shown in FIG. 2. In the two piece configuration, the top portion 30 of the body can be formed as a clear reflective acrylic cap which can be rotated to move the direction of the reflected light while the base body 22 remains stationary. The top portion 30 can be formed without the stripes to maximize the amount of light reflected outwardly through the top portion 30 without interference from the stripes.

The cap 30 can also be removed from the body to direct the light straight upward. This can be used for spotlighting purposes or to change the character of the light. Additionally figurines (not shown) may be positioned atop the light in place of the cap to light the figurine.

Second Embodiment

Figure 3:
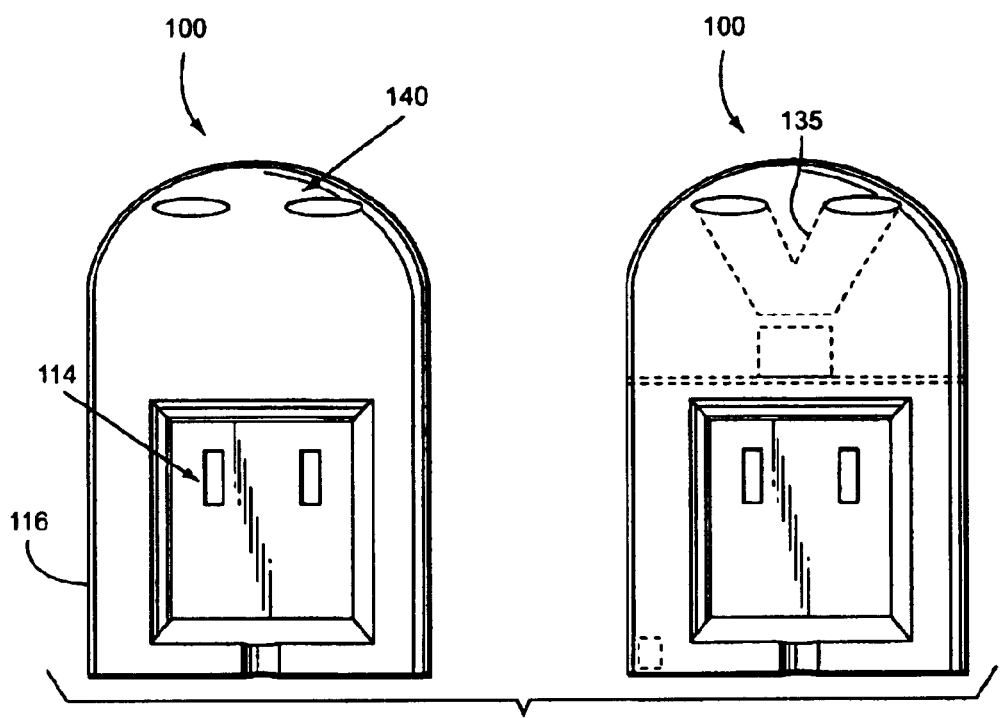
FIG. 3 is a diagrammatical view of a second embodiment of the invention.
Figure 4:
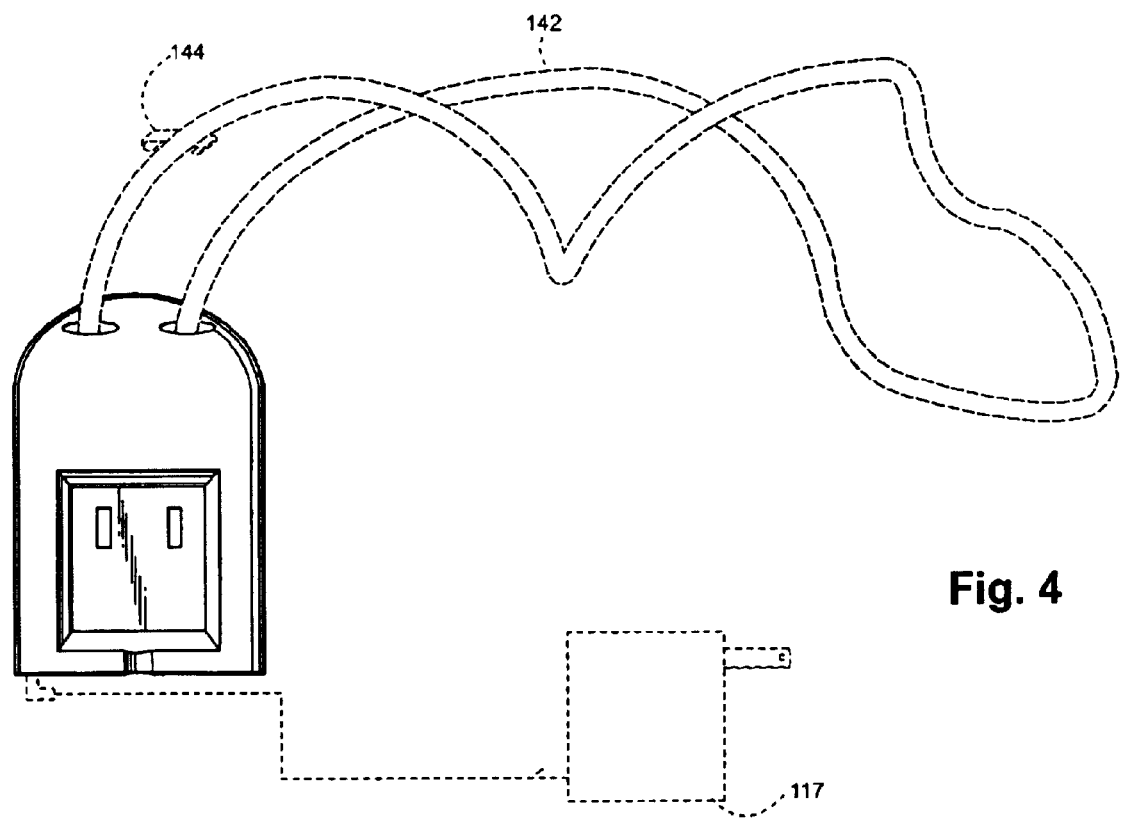
FIG. 4 is an environmental view of the second embodiment of the invention.

The second embodiment shown in FIGS. 3 & 4 of a decorative light system 100 takes further advantage of fiber optics to provide decorative, flexible lighting. A non-conductive base unit 116 has an opaque shell housing electrical plugs 114 for connecting to an electrical outlet (not shown). Alternatively or additionally the base unit can be connected to an electrical source through an external step down transformer 117 or other means well known in the art such as batteries or other AC sources.

Once the voltage is stepped down and converted to DC, the circuit is connected to an LED or group of LEDs to provide a light driver for optionally connected fiber optic carriers. A Y splitter is provided to split the light from the LED source into two port connections. Of course one skilled in the art would recognize that the ports could each be lit by separate LEDs or groups of LEDs without parting from the scope of the invention. However, preferably a Y shaped fiber optic insert 135 is placed between the LED source lights 120 and the ports 140 to channel the light into the two ports.

A cover (not shown) is preferably provided at the opening to each port with a reflective inner surface to minimize light losses when a port is not connected to a fiber optic strand. A conventional press fit, bayonet joint or quick connect (not shown) is provided on the port to receive and secure a fiber optic strand connected to the base 116 of the light driver 100. While two ports are shown in the Figures, one skilled in the art would appreciate that any number of ports could be provided. In the most preferred configuration four ports are provided with one on each side, or two on top and one of the left and right sides each.

For instance a 20 foot fiber optic strand 142 can be connected at each end to one port 140 of the light driver. When used in this fashion, the connection to each port helps minimize the light attenuation and hence brightness differentiation along the length of the fiber optic strand when used for edge lighting. The fiber optic strand may have openings or slits along its outer opaque cover (not shown) to provide lighting along the length of the strand. This may be used to light the side of an automobile, a swimming pool edge, a garden walk or other surfaces. The fiber optic covering may also be non-opaque and have a decorative pattern to enhance the lighting effect of the fiber optic strand.

The fiber optic strand can also be connected solely to one port to provide edge lighting and/or a flashlight at the end of the strand. This may be useful for providing spot lighting at a point distant from the light driver base 116 such as to run the fiber optic strands along a book shelve and have the end of the strand pointed at a trophy, picture, figurine or the like. In such case the fiber optic can either have some edge lighting to light along the bookshelf or may have an opaque cover to transport all of the light to the spot light. Fastening clips 144 may be provided to secure the fiber optic at desired location. The clip may have adhesive or hook and loop backing to secure the clip in a desired location.

Fiber optics are ideal for this purpose of indoor lighting as the light is "cold", that is, non-conductive and does not deliver heat. The fiber optic strands are also durable, and flexible, especially when compared to prior light sources such as neon, which has high voltage, high heat, and is breakable.

The ports may also be used to plug in acrylic figurines or devices. For instance an acrylic candle or night light as shown in FIG. 1, may instead plug into a light driver such as the current embodiment by appropriate sizing of the base and acrylic candle. Figurines sized to plug into the ports or utilizing a fiber optic connector can be placed atop or near the light driver to light the figurines using the light driver.

Additionally the fiber optic may be covered by a nylon rope material to further enhance the lighting effects. Such a nylon rope is described in copending application Ser. No. 10/673,194 filed Sep. 30, 2003 and is incorporated herein by reference.

Third Embodiment

Figure 5:
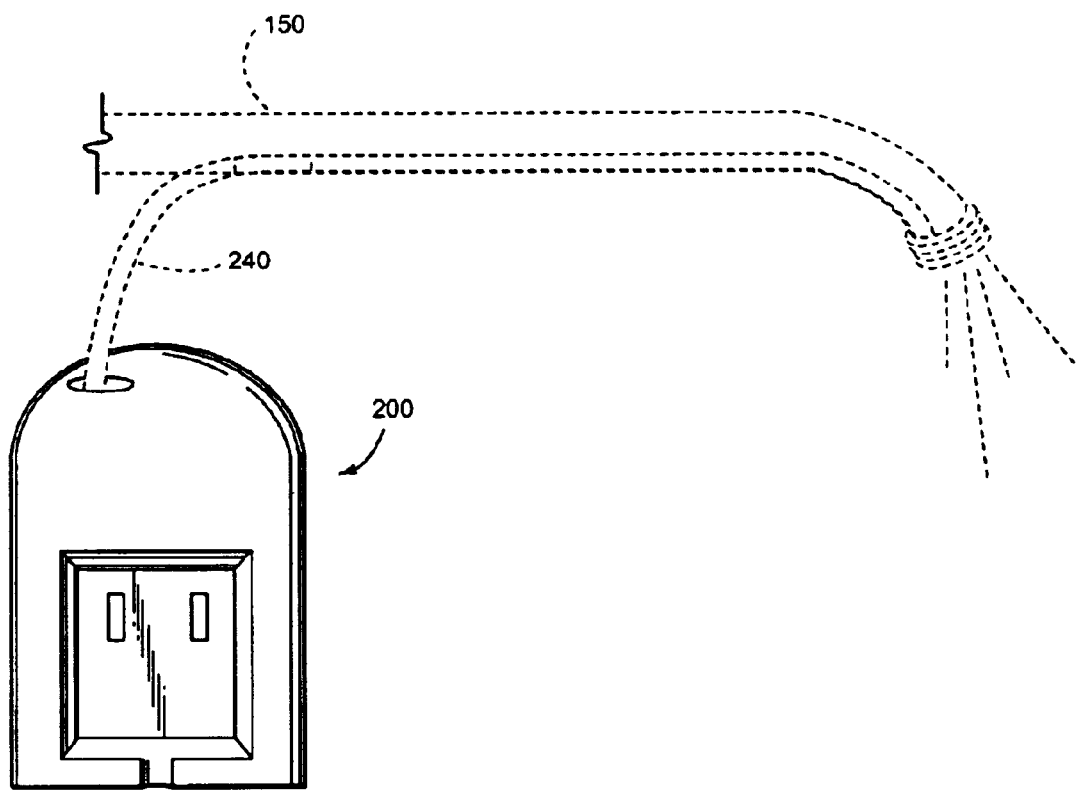
FIG. 5 is a partial breakaway, environmental view of a third embodiment of the invention.

A further application of a fiber optic light driver is shown in FIG. 5. Since the fiber optic light is "cold", that is non-electric carrying and non-heat carrying, the light can used in an aqueous environment. As shown in FIG. 5, the light driver 200 can connect to a fiber optic strand 240 that connects to and runs inside of a garden hose 150, kitchen sink faucets, or other liquid conduit. Appropriate Y connectors and seals can be used to ensure that liquid does not leak from the connection as is known to those skilled in the art. Likewise the light driver 200 can be housed in an all weather housing to withstand outdoor unwanted elements.

If the fiber optic strand 240 has an opaque housing then the light will be transported to the end of the strand. By placing the end of the strand at the end ("mouth") of the hose, the light can be used to illuminate where the hose is pointing. This can be used for practical purposes such as watering plants in poorly illuminated areas or for more decorative purposes such as illuminating the end of a soda gun used to pour soft drinks at a bar or restaurant. The lighting could also be used to light water from a fountain or similar decorative setting to light the water coming from the fountain.

The fiber optic may be run inside the liquid conduit preferably occupying less than 25% of the cross-sectional area of the liquid hose, or the fiber optic can be run parallel to the liquid conduit outside the hose or in a second chamber provided along the hose. In the preferred embodiment, the liquid conduit is translucent to facilitate viewing of the lighting effects of the fiber optic strand.

The LED may utilize a multi-color LED for decorative or for informational purposes. The LED may be controlled by an outside control circuit for instance to show white light when a water filter attached to the liquid conduit is fully functional, and to illuminate red when the filter needs to be changed. The light color could also change with the temperature of the fluid for informational or advisory purposes. The control circuit could also be used to flash, strobe, or pulsate the light along with a music source. If necessary according to the length of the fiberoptic strand and/or liquid conduit, further LED light sources and appropriate electrical conductors could be provided along the fiber optic to minimize light attenuation along the length of the fiber optic or to provide color differentiation at different points along its length.

The LED may be activated by the flow of fluid through the use of a paddle switch, flow switch, mechanical, inertial or electrical switch.

It is to be understood that the present invention is not limited to the sole embodiment described above, but encompasses any and all embodiments within the scope of the following claims.

We claim:

1. A nightlight for electrically connecting to and suspending from an electrical wall outlet having a pair of electrical sockets, said nightlight comprising:

a base having at least a pair of electrical plugs for electrically connecting to the electrical wall outlet pair of electrical sockets;

said base having a step down circuit electrically connected to said electrical plugs for receive electricity from said wall socket and stepping down said AC power to a lower range;

a converter electrically connected to said step down circuit for converting said AC power to DC power;

at least one Light Emitting Diode ("L.E.D.") powered by said converter;

an acrylic body connected to said base for receiving light from said at least one L.E.D.;

said acrylic body having a longitudinal axis and defining at least one hollow chamber therein bounded by at least one reflector; and a rotating cap on said acrylic body having a reflector angled within the range of 30–60 degrees from the longitudinal axis of said acrylic body for reflecting light from said at least one LED outwardly from said acrylic body.

2. The nightlight of claim 1, wherein said DC voltage is in the range of 2.0 to 4.0 Volts.

3. The nightlight of claim 1, where in said rotating cap is selectively removal to expose said hollow chamber.

4. The nightlight of claim 1, wherein said hollow chamber is surrounded on all sides by a plurality of reflectors.

5. The nightlight of claim 4, wherein said reflectors are white.

6. The nightlight of claim 1, wherein said at least one L.E.D. is a colored L.E.D.

7. The nightlight of claim 1, wherein said at least one L.E.D. is a multi-color L.E.D.

8. The nightlight of claim 1, wherein said nightlight is cantilevered from said electrical outlet by said electrical plugs.

* * * * *